July 20, 1926.
W. B. PAYNE
PRINTING APPARATUS
Original Filed Dec. 21, 1922   6 Sheets-Sheet 1
1,593,309
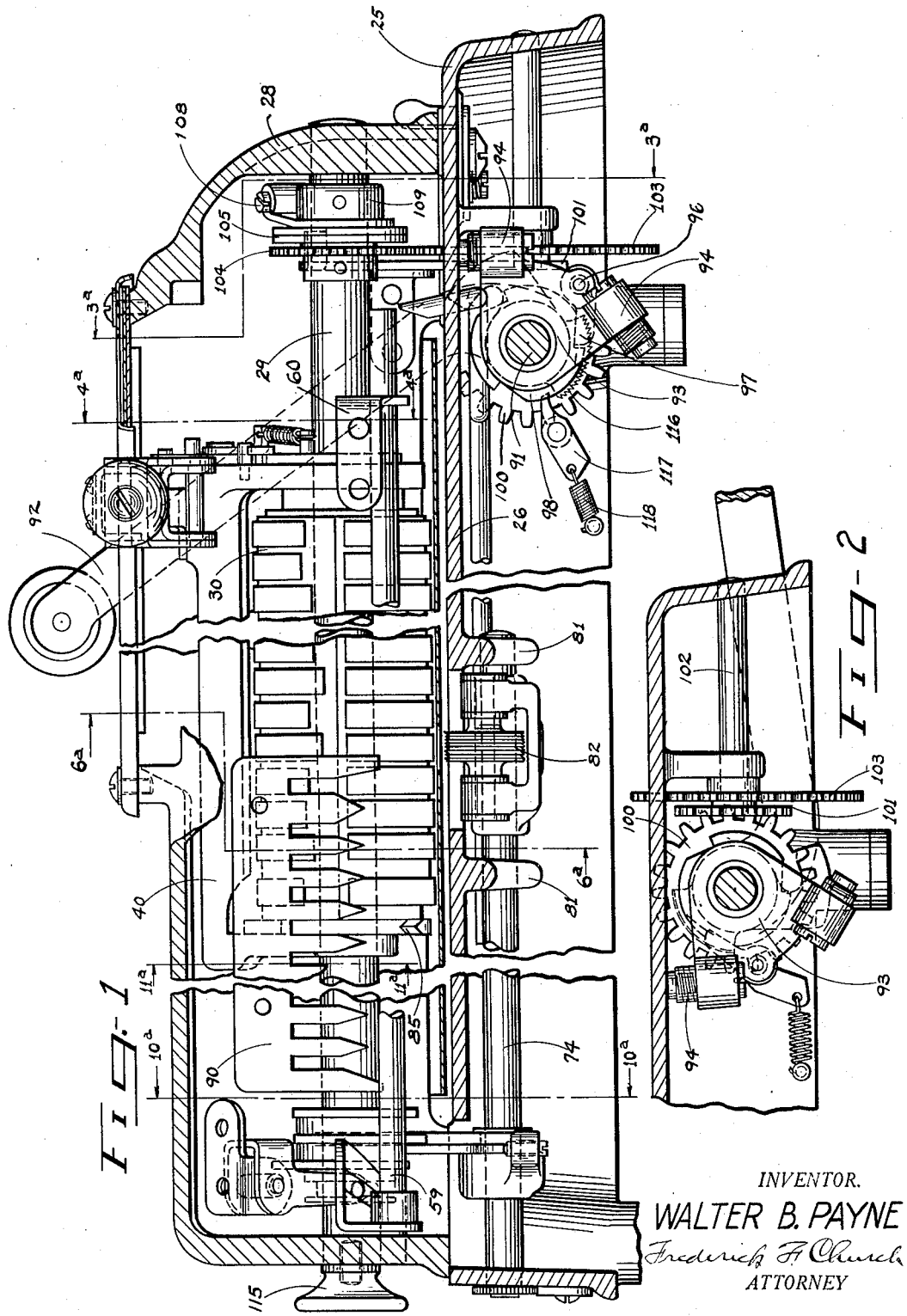
INVENTOR.
WALTER B. PAYNE
Frederick H Church
ATTORNEY July 20, 1926.

W. B. PAYNE 1,593,309

PRINTING APPARATUS

Original Filed Dec. 21, 1922  6 Sheets-Sheet 2

INVENTOR.
WALTER B. PAYNE
BY Frederick F. Church
ATTORNEY

July 20, 1926.
W. B. PAYNE
PRINTING APPARATUS
1,593,309
Original Filed Dec. 21, 1922    6 Sheets-Sheet 3
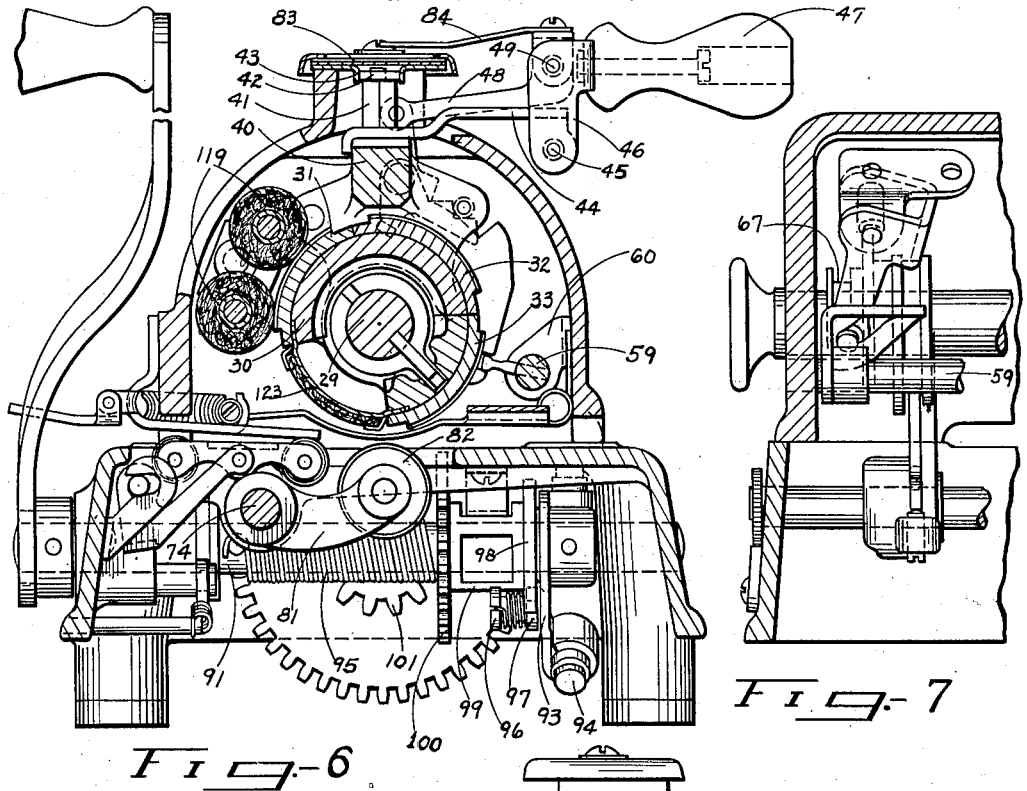
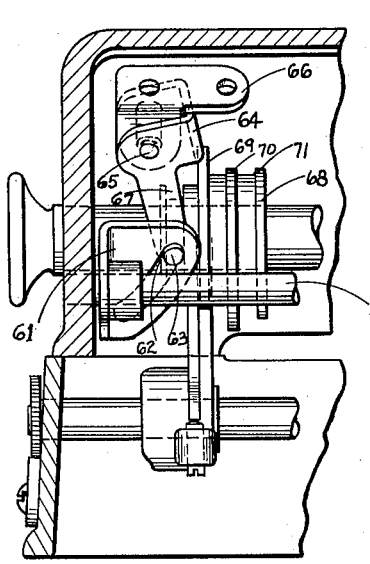
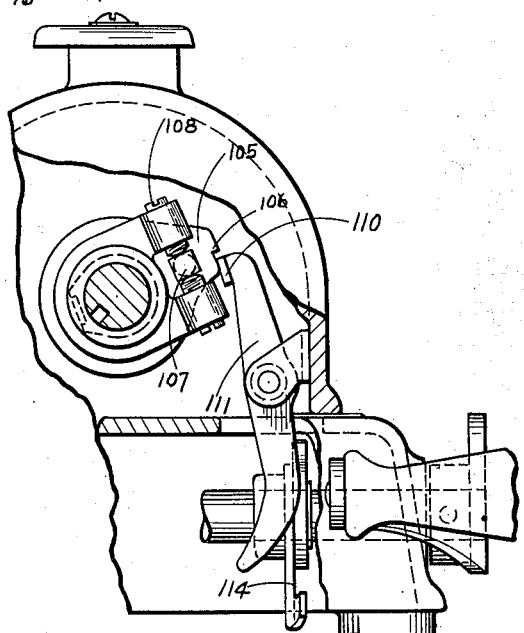
INVENTOR.
WALTER B. PAYNE
BY Frederick F. Church
ATTORNEY July 20, 1926.

W. B. PAYNE 1,593,309

PRINTING APPARATUS

Original Filed Dec. 21, 1922  6 Sheets-Sheet 4

INVENTOR.
WALTER B. PAYNE
BY Frederick F. Church
ATTORNEY

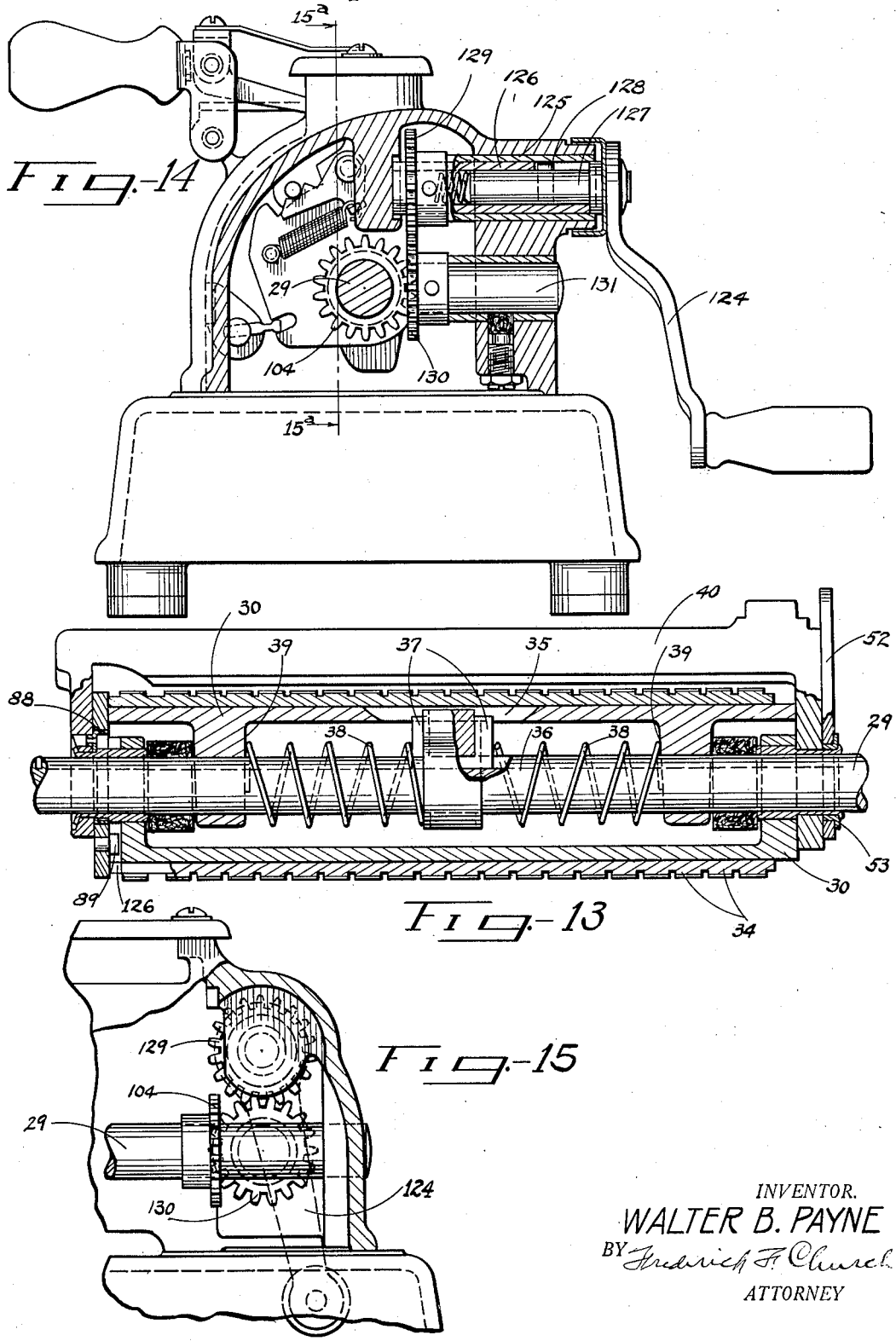

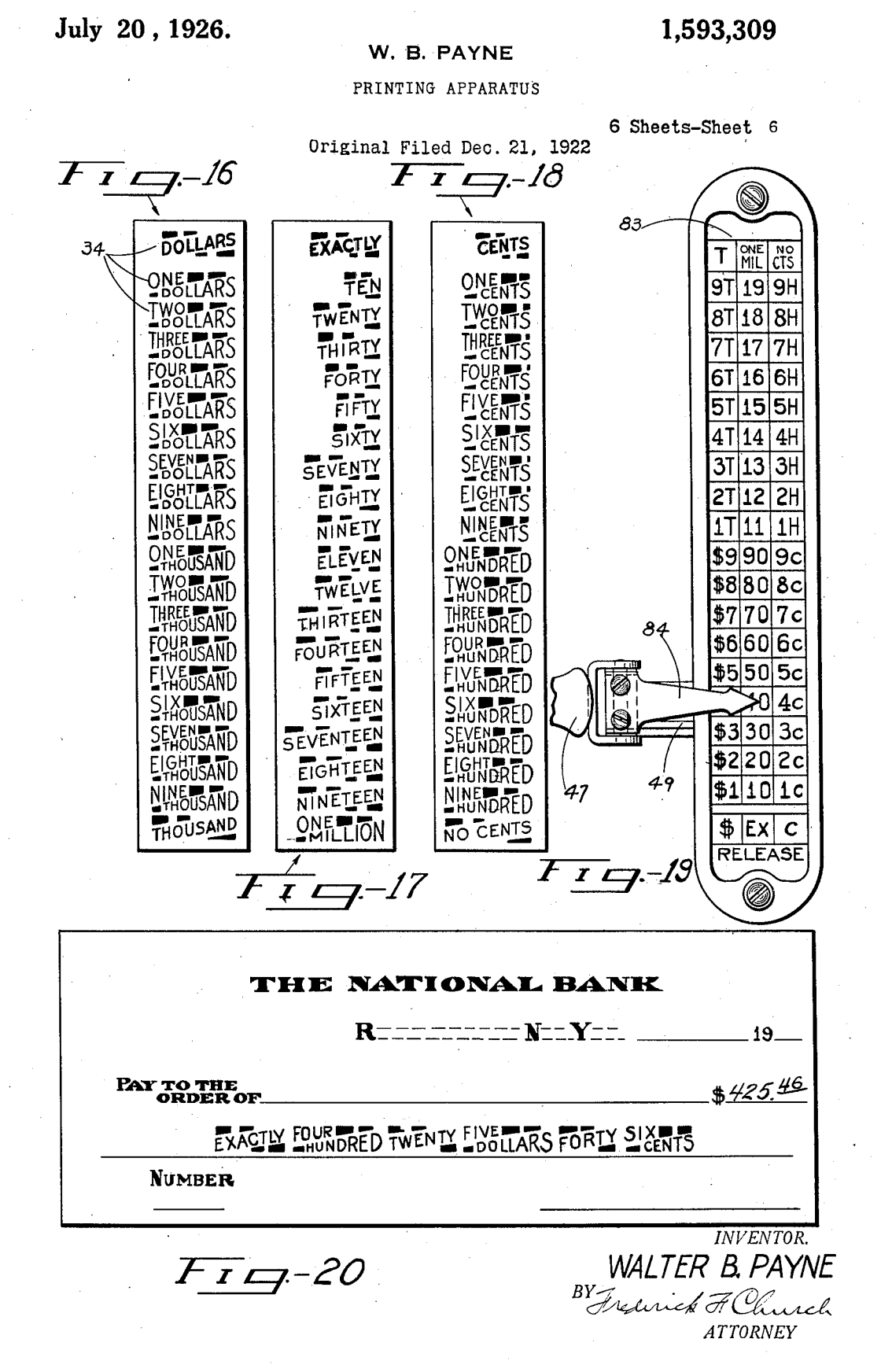

July 20, 1926.　　　　　　　　　　　　　　　　1,593,309
W. B. PAYNE
PRINTING APPARATUS
Original Filed Dec. 21, 1922　　　　6 Sheets-Sheet 6

Patented July 20, 1926.

1,593,309

UNITED STATES PATENT OFFICE.

WALTER B. PAYNE, OF ROCHESTER, NEW YORK, ASSIGNOR TO THE TODD COMPANY, INC., OF ROCHESTER, NEW YORK, A CORPORATION OF NEW YORK.

PRINTING APPARATUS.

Application filed December 21, 1922. Serial No. 608,152. REISSUED

This invention relates to printing apparatus of the variety particularly adapted for printing on checks, drafts, bonds, and other paper forms and instruments, legends such as a monetary value for protecting the instruments against alteration, as disclosed, for example, in the patent to Todd & Tiefel, No. 1,138,330, issued May 14, 1915 for checkwriters.

One object of the invention is the provision of a machine of this variety for printing amounts expressed in words, as distinguished from figures embodying an advantageous arrangement of the type facilitating printing of the legend in relatively small space and in a rapid manner.

Another object is to provide improved manipulative means for selecting and indicating the type forms required to make a given impression.

Another object is to provide in a machine of this character a construction facilitating a more compact arrangement of type forms, thereby increasing the number of such forms which may be employed in a machine of convenient size and also the range of work which may be accomplished by the machine.

Other objects are to provide improved operating means for impressing the selected type forms, for centering the latter in proper relation with the platen, for coordinating the operations of the type carrier and platen and various other improved features combining to increase the efficiency of the machine. To these and other ends the invention resides in certain improvements and combinations of parts all as will hereinafter be more fully described, the novel features being pointed out in the claims at the end of the specification.

In the drawings:

Figure 1 is a central longitudinal sectional elevation of a machine embodying the present invention, partly broken away;

Figure 2 is a sectional view of a portion of the operating means shown in Figure 1 but with the parts in different positions;

Figure 6 is a sectional view on the line 6ª—6ª in Figure 1;

Figures 7 and 8 are similar sectional views of parts shown in Figure 1 but in different operating positions;

Figure 9 is an end elevation partly in section on the line 3ª—3ª in Figure 1;

Figure 13 is a central sectional view through the type carrier and its shaft;

Figure 14 is a transverse sectional view of the machine showing a modified form of operating means;

Figure 15 is a sectional view substantially on the line 15ª—15ª in Figure 14;

Figures 16, 17 and 18 illustrate type plates detached from the carrier and developed;

Figure 19 is a top plan view of the dial and pointer of the type selecting mechanism; and Figure 20 shows a check having thereon an impression made by the machine.

Similar reference numerals throughout the several views indicate the same parts.

Figure 3:
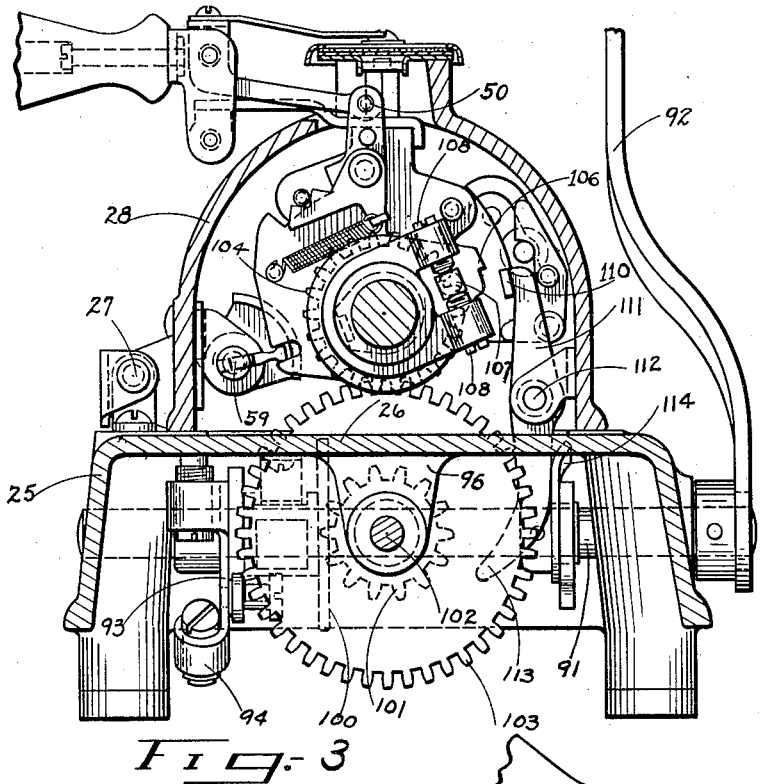
Figure 3 is a transverse sectional elevation of the machine on the line 3ª—3ª in Figure 1.

The embodiment of the invention at present preferred as best illustrating the principles involved, comprises a two-part supporting and housing frame formed by a base 25, Figure 1, providing a printing bed 26 above which there is hinged to the base as at 27, Figure 3, a casing 28 in which a rotary type carrier and its associated parts are supported and housed. The platen is in the form of a roller located below the printing bed and movable through an opening therein for engagement with the underside of the work placed on the bed to press the work into contact with the forms on the carrier in the casing above. The present machine, as more fully appears hereafter, is of the general type disclosed in said Letters Patent in which a substantially cylindrical type carrier is shifted to bring its type forms to position for cooperating individually with the platen by a printing movement which also feeds the work transversely over the printing bed.

The type carrier is preferably supported on a main rotatable shaft 29, Figure 1, journalled at its ends in the ends of the casing. The carrier is shown at 30, Figures 1, 6 and 13, as of substantially cylindrical shape, having thereon in the present instance three type plates 31, 32 and 33 spaced circumferentially of the carrier and extending longitudinally thereof and each provided with a group or column of type forms 34, as indicated in Figures 16 and 13. The carrier and shaft are formed with key slots 35 and 36, respectively, Figure 13, in which slots are slidably engaged in the opposite sides of a key or spline 37. The latter is yieldably connected with the carrier by resilient means comprising springs 38 coiled about the shaft between the spline and lugs 39 on the carrier which slidably embrace the shaft and support the carrier thereon. This construction provides for rotation of the carrier by the shaft through a yieldable spline connection assisting the operation of the type centering means, as more fully appears hereafter. It is apparent from this construction that the carrier may be slid longitudinally on the shaft to bring any of its type forms opposite the platen roller or wheel for individual printing coacting therewith as hereafter described.

The selective movement of the carrier is effected by a manipulative device comprising in the present instance a shifting means or yoke 40 of substantially inverted U-shape, the spaced arms of which embrace the ends of the carrier and slidably engage its shaft 29. The yoke is prevented from rotating however by a post 41, Figure 6, extending upwardly and carrying a member 42 working between spaced guides 43 carried by the top of the casing. The yoke is shifted along the shaft to affect the selective movement of the carrier by means comprising a bracket 44 fixed on the top of the yoke and extending laterally through a slot in the top of the casing. Pivoted on the bracket as at 45 is a clip 46 having a convenient handle 47. Movement of handle 47 therefore shifts the carrier to bring any of the type forms opposite the platen. As there is a group or plurality of type forms, however, in alignment circumferentially of the carrier means are provided also for selecting from such circumferentially aligned forms or group the particular one desired for impression. Such selection in the present character of machine is obtained by bringing the carrier and platen into engagement for the particular portion of the rotation of the carrier during which the desired type form is rotated past the platen position and the means for accomplishing such selective movement will now be described in connection with a description of the platen itself.

Figure 10:
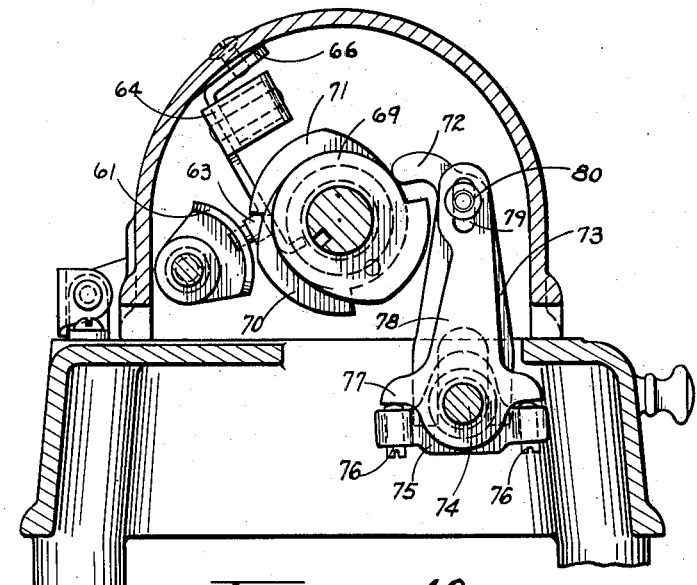
Figure 10 is a sectional view on the line 10ª—10ª in Figure 1.

The handle clip 46 has pivotally connected therewith, as at 48, a link 49 pivotally connected at its other end 50 with an extended portion 51 of a plate 52 pivotally supported on yoke 40 by a bearing 53 surrounding the main shaft. Vertical movement of handle 47 thus serves to pivotally adjust or rock plate 52 to one of three positions determined by a toothed dog 54 pivoted on the plate and engaging a pin 55 on the yoke, the dog being actuated by a spring 56 connecting it with the plate. The latter has a slot 57 therein, the sides of which engage opposite sides of an elongated rail 58 on a second or rock shaft 59 supported in bearings 60 on the casing. Shaft 59 at the other end thereof adjacent the rear of the machine carries a plate 61 having a cam slot 62 therein in which is engaged a pin 63 on a clip 64 pivotally supported as at 65 on a bracket 66 carried by the casing. Clip 64 has a part engaging in a circumferential groove 67 in a sleeve 68 splined on the main shaft. The sleeve is provided with three cams 69, 70 and 71 having substantially the same profile formed by a high circular portion concentric with the shaft but of relatively short length rising gradually at one end from the shaft and terminating at the other in an abrupt shoulder as shown. Pivotal movement of the selecting handle 47 through the mechanism described above serves to shift cam sleeve 68 along the main shaft to bring one or the other of its cams opposite and into position for actuating a follower 72, Figure 10, formed by the curved upper end of a plate 73 having a bifurcated lower end supported on and loosely embracing the shaft 74 which is journalled in the base for operating the platen. Shaft 74 has fixed thereon a yoke 75 extending on opposite sides of the shaft and carrying set screws 76 cooperating with wings 77 on an arm 78 pivoted on the shaft and extending upwardly through an opening in the printing bed. The upper end of this arm is slotted as at 79 adjustably clamped as by means of a bolt 80 to the follower arm 73. The latter is thus adjustable toward and from or radially of the platen shaft 74, or substantially along the path of the cams, 69, 70 and 71, for varying the time of coaction therewith. It is apparent also that arm 78 may be swung about the platen shaft as a pivot to carry the follower 72 toward and from the profiles of the cams for varying the amplitude of the rocking movement imparted by the cams to the platen shaft. The adjustment of the cams to bring one or the other of them in position for operating the follower 72 thus determines the portion of the revolution of the carrier at which the platen shaft is rocked to raise the platen as described below for engagement with the type form, thereby selecting one of the circumferentially aligned forms exclusively for impression on the work.

Platen shaft 74 is journalled at one end in the base and adjacent its other in lugs 81 depending from the printed bed. Fixed on the shaft between these lugs is a yoke 81, the spaced arms of which rotatably support the platen roller or wheel 82 which is thus disposed eccentrically of the shaft and raised and lowered by rocking movement thereof. The impression surfaces of the platen and type forms are preferably grooved for the purpose of breaking the surface of the paper to facilitate absorption by the latter of the printing ink, as well understood in the art. It is apparent therefore that by means of the construction described handle 47 may be manipulated to select any group of the type forms on the carrier and also any desired type form in the selected group for cooperation individually with the platen to print the work, the main shaft being of course rotated by suitable means hereafter described after each selective movement to produce the impression and by selective employment of the individual type forms in succession a desired legend may be completely impressed upon the work.

Figure 4:
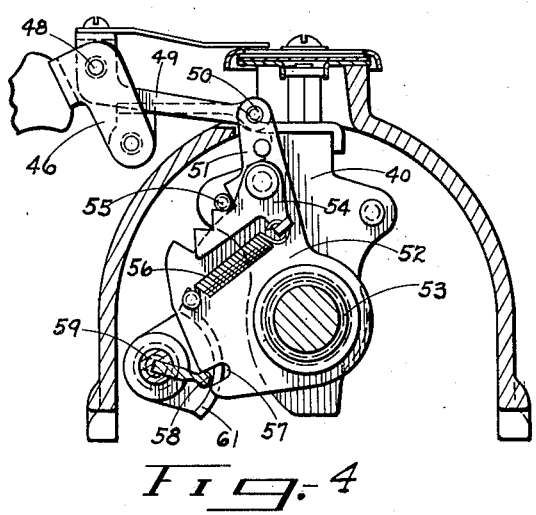
Figures 4 and 5 are similar sectional views substantially on the line 4ª—4ª in Figure 1, but showing the parts in different operating positions.

The means for indicating the selective movements of the handle 47 comprises preferably a dial plate 83, Figures 6 and 19, having marked thereon representations of the different type forms arranged in the same relative order as on the carrier but abbreviated to economize space. Cooperating with this dial is a single index or pointer 84 fixed on link 49, these parts being so constructed and arranged that the link and pointer remain substantially horizontal in the different positions of adjustment and the handle may be rapidly moved directly from one type form indication to another. The handle and pointer are automatically centered relative to each type form indication not only by the dog 54 on plate 52, Figure 4, as already described, but also by the type centering means which precisely adjusts the position of the carrier longitudinally of the main shaft as hereafter described.

Figure 11:
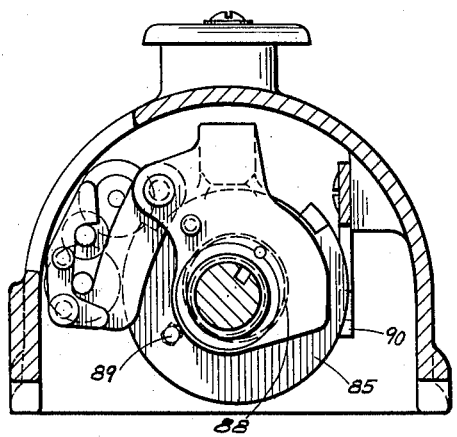
Figures 11 and 12 are similar sectional views substantially on the line 11ª—11ª in Figure 1, illustrating the centering means in different operating positions.
Figure 12:
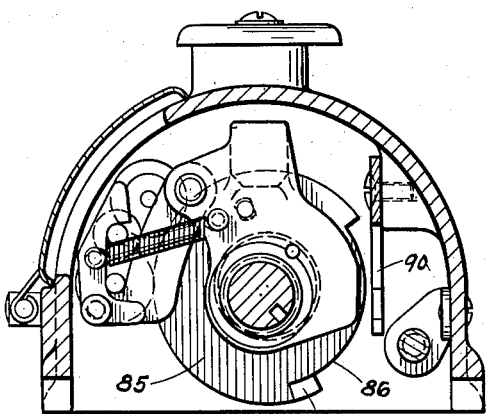

The type centering means is best shown in Figures 11 and 12 and comprises a disk 85, the circular periphery of which is partially cut away, as at 86, with the leading shoulder of the depression bevelled as at 87 to provide a wedge effect. The disk is rotatably carried on a bearing 88, Figures 13 and 11 on the carrier yoke 40 surrounding and eccentric to the main shaft for the purpose of elevating the periphery of the disk to clear the work. The disk is rotated by a pin 89 and slot connection 126 with the carrier and its periphery, formed as described, coacts with a toothed member 90 stationarily carried by the casing. The teeth of member 90 form between them a series of intervals each corresponding to a different position of the carrier for bringing the corresponding type to position for cooperation with the platen and as the carrier is rotated after approximate adjustment by the manual means described, the bevelled surfaces of the disk and member 90 are engaged to complete the longitudinal shifting movement of the carrier to precisely center the type form. It has been found that the yielding connection between spline 37 and the type carrier serves to permit the latter to be easily adjusted by the centering means during the rotation of the carrier by the main shaft without any tendency of the parts to bind upon each other.

The operating means for rotating the main shaft and carrier comprises preferably a shaft 91 extending transversely of the base at the forward end of the machine and rotatably supported at its ends in the opposite sides thereof. At one side of the base the shaft projects outwardly and has fixed thereon a crank handle 92 having a swinging movement from the position shown in Figure 1 to that shown in Figure 2 to rock shaft 91 for producing each printing impression. The shaft has fixed thereon a plate member 93 provided with adjustable spaced stops 94 for engagement with the printing bed to limit the swinging movement of the operating handle and a spring 95, Figure 6, coiled about and secured to the shaft and to the base urges the handle to its normal raised position. Member 93 carries a post 96 on which is pivotally supported a pawl 97 spring actuated into engagement with a three-toothed ratchet 98 fixed on a sleeve 99 rotatably supported on shaft 91. The sleeve has fixed thereon also a gear 100 meshing with a gear 101 fixed on a short shaft 102 rotatably supported by suitable bearings on the base, Figure 2. This shaft has fixed thereon also a larger gear 103, the toothed periphery of which projects through an opening in the printing bed above the latter and into meshing engagement with a gear 104 fixed on the main shaft 29, it being apparent that these gears are arranged to mesh as shown when the casing is moved toward the base to closed position. The casing may however of course be swung away from the base on its hinges 27 to expose the interior parts for inspection, the driving and driven gears 103 and 104, respectively, meshing and unmeshing with each other during such movement of the casing. These parts are so constructed and arranged that each forward actuation of handle 92 rotates gear 100 by the pawl and ratchet means described through one third of a revolution and the gear ratios are such as to thereby rotate the main shaft and carrier through one complete revolution to make an impression. As it may be desirable at times to swing the casing away from the base to open position and to partially rotate the carrier for inspection of different portions thereof, means are provided for returning the carrier, main shaft and gear 104 to position for meshing the latter with gear 103 in properly timed relation. Such means comprises in the present instance a stop plate 105 rotatably carried on the main shaft and formed with a shoulder 106. The plate is provided also with a lug 107 with the opposite sides of which are engaged adjusting screws 108 carried by spaced arms on a collar 109 fixed on the main shaft. By adjusting screws 108 the plate and stop shoulder 106 may be adjusted angularly about the main shaft. Cooperating with the stop shoulder is an end 110 of a dog 111 pivoted on the casing at 112. The other end of the lever extends downwardly through an opening in the printing bed, being formed with a curved surface 113 with which engages an arm 114 fixed on the shaft 91 of the operating handle. These parts are so arranged that in the initial position of the handle, as shown in Figure 3, arm 114 engages and swings lever 111 out of the path of stop shoulder 106. When the handle is swung forwardly and downwardly however to rotate the carrier for making an impression, arm 114 eventually disengages lever 111, as shown in Figure 9, after the stop shoulder has cleared the lever, allowing the upper end 110 of the lever to swing by gravity, or under the actuation of a suitable spring, into the path of the stop shoulder, so that the carrier is always brought to rest after a printing impression with its type forms in proper relation to the platen for the next impression. Also when the carrier has been partially rotated, with the gears 103 and 104 unmeshed as described above, the main shaft may be rotated by a suitable handle 115 thereon at the rear end of the machine until stop shoulder 106 engages dog 110 to properly position the parts including gear 104 for movement of the casing to normal closed position on the base. This causes the gears to mesh in properly timed relation for normal operation by the operating handle.

To insure a full stroke of the operating handle and a complete impression at each operation of the machine the shaft 91 has fixed thereon a toothed ratchet sector 116, Figure 1, with which cooperates a pawl 117 pivoted on the base and actuated by spring 118, the pawl being adapted to engage the ratchet upon commencement of movement of the operating handle and to prevent return of the latter until its movement is completed, when the pawl drops off the other end of the ratchet and may be swung to inactive position by the return of the handle, as well understood in the art.

Figure 5:
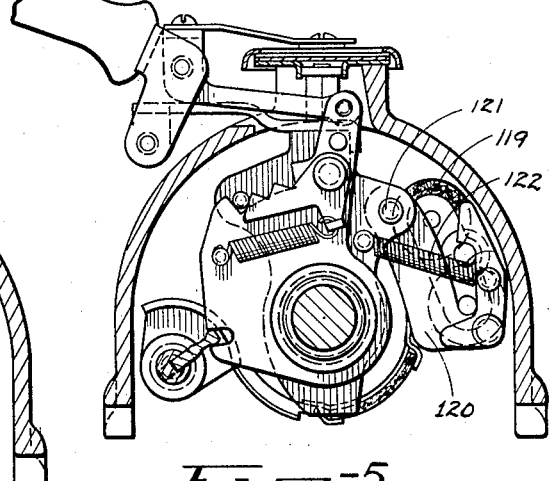

Suitable means are provided for inking the type forms during the rotation of the carrier comprising, preferably, inking rolls 119 rotatably supported by suitable carrying means indicated generally at 120, Figure 5, as pivoted at 121 on the yoke. Springs 122 connected with the yoke and the carrying means urge the rollers to position for engagement with the type forms during rotation of the latter as shown in Figure 6. This inking device forms no part of the present invention so that detailed explanation thereof appears unnecessary. The space between the type plates on the latter may be provided as shown in Figure 6 with an ink carrying and spreading pad 123.

The efficient indicating and selecting mechanism described renders it practicable to arrange the type forms in three or more groups spaced circumferentially on the carrier and to thus economically utilize practically the whole cylindrical surface of the latter. This not only reduces the length of the carrier for a given number of type forms, as well as the length of its selective movement and therefore of the machine as a whole, but also provides for a substantial increase in the total number of forms which may be employed. It thus becomes practicable, with a larger available number of forms, to employ an advantageous system of forms which is an important feature of the present invention. This system comprises the provision of a separate form for printing each of the words representing the series of numbers from "eleven" to "nineteen" inclusive, and the multiples of "ten" up to "ninety", inclusive, Figure 17, and the provision also of several groups of forms in each of which the individual forms represent the combination of a units digit with a word denoting the denomination thereof, as "hundred" or "thousand", or the unit of measure or currency, as "dollars" or "cents", Figures 16 and 18. These forms may be selectively combined to print an amount or value as illustrated in Figure 20. A large proportion of the words required to express an amount or monetary value may thus be printed two at a time, thereby reducing by one half the number of impressions and the time required to write a legend. A further feature of this system resides in arranging the individual words at an inclination to the printing line as shown which reduces the length occupied along the line of the legend as a whole. But of still greater importance in this respect is the arrangement of the combined digit and denominational or currency words one above the other in overlapping relation, as shown, on each of the corresponding type forms, so that this system of arrangement provides not only for a material reduction in the length of the space occupied by the legend but also for a substantial saving in the number of operations and time required for printing it upon the work.

In Figures 14 and 15 there is shown a modified construction for the operating handle and its connection with gear 104 of the main shaft 29. In this form the handle 124 is supported for complete rotation on the casing. The latter has a bearing sleeve or bushing 125 in which is rotatably supported a sleeve 126. The crank has a spindle 127 adapted to be detachably inserted in sleeve 126 and secured therein by a pin and slot connection of any suitable variety indicated at 128. Sleeve 126 has fixed at its inner end a gear 129 meshing with a gear 130 rotatably supported on a stub shaft 131 and meshing with the driven gear 104. In this arrangement the crank is always connected with the carrier and is given a complete rotation for making each impression.

The operation of the machine has been described in connection with the description of the construction and it is apparent that the invention provides a practical and efficient machine of the variety described in which a large range of printing type forms are compactly disposed on the carrier and in such a way as to reduce the range of selective shifting movement of the latter. The selection of the forms to be printed is quickly and conveniently made by the manipulative device and dial described, and after each type form is thus selected it is printed on the work by a convenient forward actuation of the operating handle 92. The type forms are also disposed on the carrier in such a relation to each other and the printing line as to enable an amount expressed in words to be written in compact form along the printing line. The combination of the words on certain of the individual type forms so that two words may be printed at a single impression increases the speed and convenience of the machine. And in addition to these features the invention provides the various other advantageous details of construction and arrangement described above which combine to afford an improved and highly efficient machine for the purposes specified.

I claim as my invention:

1. In a machine of the class described, the combination of a type carrier having a plurality of groups of type forms thereon, dial means provided with correspondingly arranged representations of said forms, a platen common to said forms and cooperating individually therewith, a manipulative device operable to select both the group and the type form in said group to be printed from, a single index on said device movable over the dial means into registry with any form represented thereon to indicate the selection thereof for printing, and means independent of said manipulative device for effecting printing engagement of the platen and selected type form.

2. In a machine of the class described, the combination of a shiftable type carrier having a plurality of groups of type forms thereon, means for shifting said carrier, a platen common to the type forms and cooperating individually therewith, a handle movably carried by said shifting means, an actuating member movable on said shifting means, a connection between said handle and member for moving the latter, mechanism actuated by said member comprising a rock shaft and a cam carried thereby for selecting a type form to be printed from, and means for effecting printing engagement of the platen and selected type form.

3. In a machine of the class described, the combination of a shiftable type carrier having a plurality of groups of type forms thereon, dial means having correspondingly arranged representations of said forms, means for shifting said carrier, a platen common to the type form and cooperating individually therewith, a handle movably carried by said shifting means, mechanism comprising an actuating member movable on said shifting means for selecting a type form to be printed from, a connection between said handle and member for moving the latter, a single index connected with said handle for movement over the dial means into registry with any form represented thereon to indicate the selection thereof for printing, and means for effecting printing engagement of the platen and selected type form.

4. In a machine of the class described, the combination of a type carrier having a plurality of type forms arranged in three groups, dial means provided with correspondingly arranged representations of said forms, a common platen for said forms cooperating individually therewith, a manipulative device operable to select both the group and the type form in said group to be printed from, a single index finger on said device movable over said dial means into registry with any one of said three groups and with any type form thereof to indicate the type form selected for printing, and means independent of said manipulative device for effecting printing engagement of the platen and selected type form.

5. In a machine of the class described, the combination of a shiftable type carrier having a plurality of groups of type forms thereon, dial means having correspondingly arranged representations of said forms, means for shifting said carrier, a platen common to the type forms and cooperating individually therewith, a bracket on said shifting means, a handle pivotally carried by said bracket, mechanism comprising an actuating member pivotally supported on said shifting means for selecting a type form to be printed from, a link pivotally connected with said handle and with said actuating member for moving the latter, an index carried by said link for movement over said dial means into registry with any type form represented thereon to indicate the selection thereof for printing, and means for effecting printing engagement of the platen and selected type form.

6. In a machine of the class described, the combination of a shiftable type carrier having a plurality of groups of type forms thereon, means for shifting said carrier, a platen common to the type forms and cooperating individually therewith, a manually operable device movably carried by said shifting means, a rock shaft, a member movably carred by said shifting means and connected with said handle and shaft for actuation by the handle to rock said shaft, a cam on said shaft, means actuated by said cam for selecting a type form to be printed from, and means for effecting printing engagement of said selected type form and platen.

7. In a machine of the class described, the combination of a shiftable type carrier having a plurality of groups of type forms thereon, dial means provided with correspondingly arranged representations of said forms, a yoke for shifting said carrier, a platen common to said forms and cooperating individually therewith, a handle pivoted on said yoke, a plate pivoted on the yoke, a link pivotally connected with said handle and plate, a rock shaft provided with a cam and connected with said plate for actuation by the latter, said handle having a movement in one direction to shift said carrier to select a group of forms and in another direction to adjust said cam, mechanism controlled by said cam to select a type form in said selected group, a pointer connected with said handle for movement thereby over said dial means to indicate the group and type form selected, and means for effecting printing engagement of the selected type form and platen.

8. In a machine of the class described, the combination of a base, a casing movable toward and from the base into closed and open positions, respectively, to expose interior parts, a type carrier in said casing provided with a plurality of groups of type forms, a platen on said base common to said forms and cooperating individually therewith, a manipulative device operable to select both the group and the type form in said group to be printed from, and means for effecting printing engagement of the selected type form and platen comprising a driving gear rotatably carried on the base, and a driven gear for actuating said type carrier rotatably mounted in said casing for intermeshing engagement with said driving gear when said casing is moved to closed position.

9. In a machine of the class described, the combination of a base, a casing movable toward and from the base into closed and open positions, respectively, to expose interior parts, a type carrier in said casing provided with a plurality of type forms, a platen on said base common to said type forms and cooperating individually therewith, a manipulative device operable to select the type form to be printed from, indicating means for said device, a driving gear rotatably carried on said base, and a driven gear for actuating said type carrier rotatably mounted in said casing for intermeshing engagement with said driving gear when said casing is in closed position.

10. In a machine of the class described, the combination of a base, a casing movable toward and from the base into closed and open positions, respectively, to expose interior parts, a type carrier in said casing provided with a plurality of type forms, a platen on said base common to said type forms and cooperating individually therewith, a manipulative device operable to select the type form to be printed from, indicating means for said device, a driving gear rotatably carried on said base, a driven gear for actuating said type carrier rotatably mounted in said casing for intermeshing engagement with said driving gear when said casing is in closed position, and a device for positioning said driven gear for engagement with said driving gear in properly timed relation.

11. In a machine of the class described, the combination of a base, a casing movable toward and from the base into closed and open positions, respectively, to expose interior parts, a type carrier in said casing provided with a plurality of type forms, a platen on said base common to said type forms and cooperating individually therewith, a manipulative device operable to select the type form to be printed from, indicating means for said device, a driving gear rotatably carried on said base, an operating element having a swinging movement on the base and connected by pawl and ratchet means with said driving gear, and a driven gear for actuating said type carrier rotatably mounted in said casing for intermeshing engagement with said driving gear.

12. In a machine of the class described, the combination of a base, a casing movable toward and from the base into closed and open positions, respectively, to expose interior parts, a type carrier in said casing provided with a plurality of type forms, a platen on said base common to said type forms and cooperating individually therewith, a manipulative device operable to select the type form to be printed from, indicating means for said device, a driving gear rotatably carried on said base, an operating element on the base for rotating said driving gear, a driven gear for actuating said type carrier rotatably mounted in said casing for intermeshing engagement with said driving gear when said casing is in closed position, a stop device on the casing for positioning said driven gear for engagement with said driving gear in properly timed relation, and means for rendering said stop device inoperative in the closed position of the casing.

13. In a machine of the class described, the combination of a base, a casing movable toward and from the base into closed and open positions, respectively, to expose interior parts, a type carrier in said casing provided with a plurality of type forms, a platen on said base common to said type forms and cooperating individually therewith, a manipulative device operable to select the type form to be printed from, indicating means for said device, a driving gear rotatably carried on said base, an operating element on the base for rotating said driving gear, a driven gear for actuating said type carrier rotatably mounted in said casing for intermeshing engagement with said driving gear when said casing is in closed position, a stop device on the casing for positioning said driven gear for engagement with said driving gear in properly timed relation, and means connecting said element and stop device for controlling the operation of the latter.

14. In a machine of the class described, the combination of a type carrier having thereon a plurality of separate type forms, dial means provided with representations of said forms spaced from one another in different directions, platen means cooperating individually with said forms, manipulative means operable to select said forms for cooperation individually with said platen means, a single index for said manipulative means movable over said dial means in each of said different directions for registry with any of said forms represented thereon, and means independent of said manipulative means for effecting printing engagement of said platen means and selected type form.

15. In a machine of the class described, the combination of a type carrier having thereon a plurality of separate type forms, dial means provided with representations of said forms spaced from one another in different directions, platen means cooperating individually with said forms, manipulative means movable in each of said different directions to select said forms for cooperation individually with said platen means and provided with a single index adapted to be brought by said movements into indicating registry with each of said type forms represented on the dial, and means independent of said manipulative means for effecting printing engagement of said platen means and selected type form.

16. A machine of the class described for printing any one of a range of amounts expressed in words comprising a type carrier, a plurality of type forms arranged in one or more groups on the carrier and each form representing a word expressing one of a series of numbers, said forms being arranged at an inclination to the printing line to reduce the space along the latter occupied thereby, a plurality of type forms arranged in one or more groups and each representing the combination of a word expressing a digit with a word denoting the denomination thereof or the unit of measure in which an amount is expressed, said combined words being compactly arranged in overlapping relation, a platen cooperating individually with the type forms, manipulative means for selecting the group and the type form thereof to be printed, and operating means effecting relative impressing movement of the selected type forms and platen.

17. In a machine of the class described, the combination of a type carrier having a plurality of type forms thereon, a platen cooperating individually with said forms, a rotatable shaft along which said carrier is shiftable to bring said forms selectively into cooperating relation with the platen, means for centering a selected form relative to the platen, a spline sliding in grooves in the carrier and shaft for rotating the carrier and a resilient, yieldable connection between said carrier and spline affording relative movement therebetween parallel with the shaft during the operation of said centering means.

18. In a machine of the class described, the combination of a type carrier having a plurality of type forms thereon, a platen cooperating individually with said forms, a rotatable shaft along which said carrier is shiftable to bring said forms selectively into cooperating relation with the platen, a yoke for shifting said carrier, means connecting the shaft and carrier for rotating the latter, and means for centering a selected form relative to the platen comprising a stationary toothed member, a disk rotatable on the yoke for engagement at its periphery with said toothed member, said disk having a portion of its periphery cut away to clear said member in one position, and a connection between said carrier and disk for rotating the latter.

19. In a machine of the class described, the combination of a type carrier provided with a plurality of type forms, a rotatable shaft for rotating the carrier, a second shaft spaced from the first and provided with means eccentric thereto for rotatably supporting a platen, a cam on said first shaft, a follower cooperating with said cam, and means connecting said second shaft and follower affording adjustment of the latter toward and from the cam and also along the path thereof for controlling the amplitude of movement toward and from the carrier imparted to the platen and the time of such movement relative to the rotary movement of the carrier.

20. In a machine of the class described, the combination of a type carrier provided with a plurality of type forms, a rotatable shaft for rotating the carrier, a second shaft spaced from the first and provided with means eccentric thereto for rotatably supporting a platen, a cam on said first shaft, a yoke fixed on said second shaft, a radial arm on the latter connected with said yoke for adjustment angularly about said second shaft to carry its outer end toward and from the profile of said cam, and a follower for said cam adjustable on said arm toward and from said second shaft to vary the time of the movement imparted to the platen relative to the rotation of the carrier.

WALTER B. PAYNE.